Sept. 8, 1953
R. O. DODGE
2,651,094
BAND CLAMP
Filed March 26, 1951
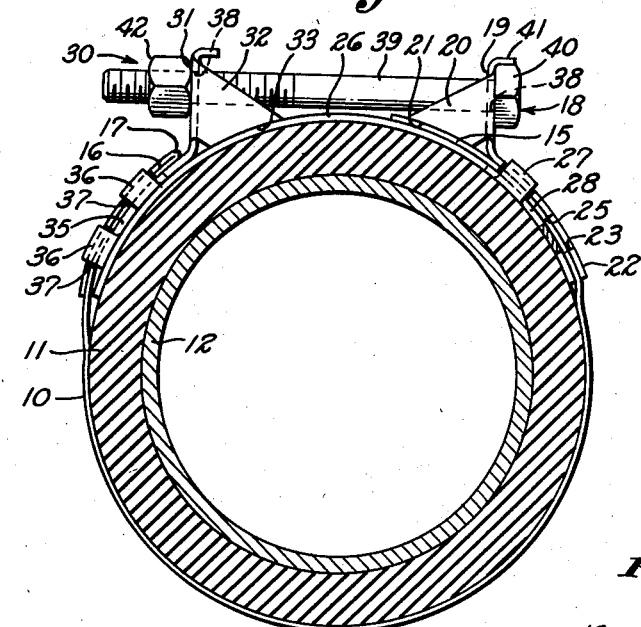
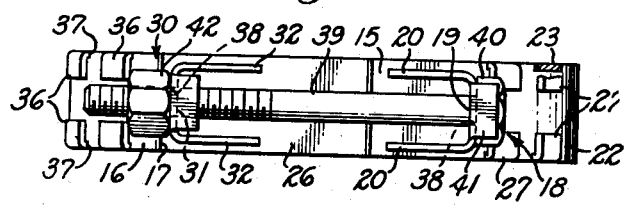
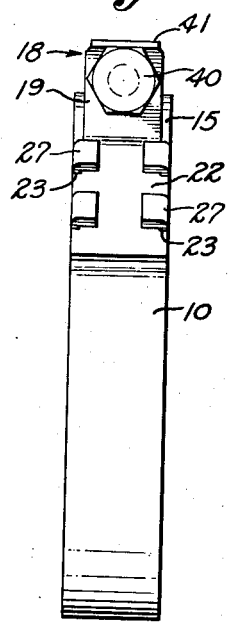
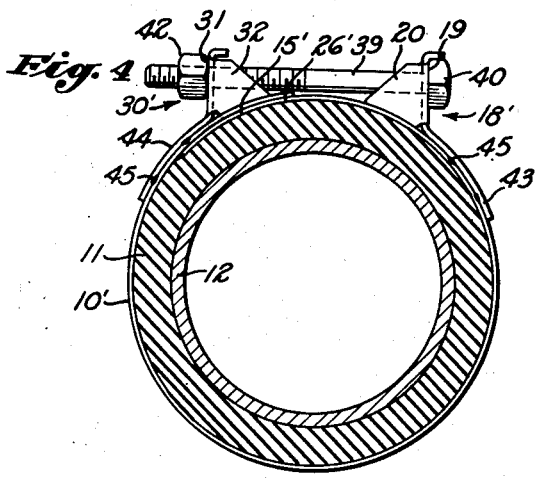
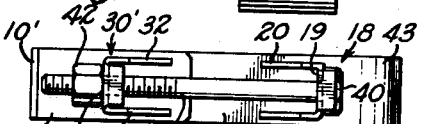
INVENTOR:
RALPH O. DODGE
BY HIS ATTORNEYS
HARRIS, KIECH, FOSTER & HARRIS Patented Sept. 8, 1953

2,651,094

UNITED STATES PATENT OFFICE 2,651,094

BAND CLAMP

Ralph O. Dodge, West Los Angeles, Calif., assignor, by mesne assignments, to Wheelcraft Corporation, Azusa, Calif., a corporation of California Application March 26, 1951, Serial No. 217,599

2 Claims. (Cl. 24—279)

This invention relates generally to clamping devices and more particularly to a clamping band or ring of the type which is employed for connecting tubing or hose to a pipe or coupling.

An object of the invention is to provide a band clamp comprising a banding member having locking elements carried adjacent each of the ends thereof, said locking elements being rigidly connected to the banding member so that, upon drawing together the locking elements, the load imposed thereon is transmitted to the banding member.

It is a further object of my invention to provide a band clamp comprising a generally circular banding member adapted to encircle a tubing to be clamped and having a locking element carried adjacent each of the ends thereof, said locking elements including upstanding wall portions connected together by suitable tensioning means and side portions adapted to bear against the banding member and transmit inwardly thereto a component of the forces imposed on the wall portions of the locking elements upon drawing together the locking elements to constrict the banding member.

An additional object is to provide a clamping device having locking elements against which the load required to constrict the banding member is imposed, said locking elements being rigidly secured to the banding member and braced against distortion or bending in the direction of maximum load.

An additional object is the provision of a band clamp which is simple and inexpensive to construct and manufacture while being efficient and durable in use.

Other objects of the invention will be obvious from the following detailed description and from the accompanying drawing, in which:

Fig. 1 is a side elevational view illustrating a form of the band clamp of the present invention mounted in clamped position;

Fig. 2 is a top plan view of the clamp shown in Fig. 1;

Fig. 3 is a front elevational view thereof;

Fig. 4 is a side elevational view of a modified form of band clamp embodying the principles of the present invention mounted in clamped position; and Fig. 5 is a top plan view of the form of clamp shown in Fig. 4.

Referring more particularly to the form of the invention shown in Figs. 1, 2, and 3 of the drawing, there is shown a band clamp including a banding member 10 consisting of a generally circular strap of metal encircling a tubing 11, which in turn is fitted over a pipe 12. The banding member 10 has end portions 15 and 16, the end portion 16 being doubled back upon itself, as indicated at 17, to form a double thickness of metal strap.

Mounted adjacent the end portion 15 of the banding member is a locking element 18, which includes an upstanding wall portion 19 and a pair of identical side portions or braces 20 integrally formed therewith, such side portions being generally triangular in configuration and extending forwardly and inwardly from opposite edges of the wall portion 19, in a plane perpendicular thereto, to the banding member 10. The lower edges 21 of the side portions 20 are longitudinally curved to conform generally to the configuration of the banding member 10 as constricted in use and seat firmly against the banding member.

The locking element 18 also includes a rearwardly extending longitudinally arcuate strap portion 22 overlying and engaging the end portion 15 of the banding member, the edges of which are notched, as indicated at 23, to correspond with like notches 25 in the edges of the end portion 15 of the banding member.

An arcuate tongue strap 26 underlies the end portions 15 and 16 of the banding member and bridges the space therebetween, forming an extension portion of the banding member. The tongue strap 26 is provided with a series of tabs 27 formed integrally therewith at its edges adjacent an end 28 thereof. The tabs 27 are so located as to index with the notches 23 and 25 formed in the edges of the strap portion 22 of the locking element 18 and the end portion 15 of the banding member 10 and extend through such notches up over the edges of the strap portion 22, the tabs 27 being bent inwardly and tightly crimped to rigidly secure together the tongue strap 26, banding member 10, and locking element 18.

Mounted adjacent the end portion 16 of the banding member 10 is a locking element 30, which includes an upstanding wall portion 31 and a pair of identical side portions 32 integrally formed therewith each having a lower edge 33 which is longitudinally curved to conform to the curvature of the banding member 10 and seat on the tongue extension 26 thereof, the portions of the locking element 30 thus described being identical to the corresponding portions of the locking element 18.

The locking element 30 also includes a longitudinally arcuate strap portion 35 adapted to underlie and engage the end portion 16 of the banding member 10. The strap portion 35 has a series of tabs 36 formed integrally therewith at its edges, the tabs 36 being so located as to index with a series of notches 37 formed in the edges of the banding member 10 adjacent the end portion 16 thereof and extend through such notches up over the edges of the banding member 10 and are bent inwardly and tightly crimped to rigidly secure together the banding member 10 and locking element 30.

Each of the locking elements 18 and 30 is apertured, as indicated at 38, approximately centrally of the wall portion thereof to receive suitable tensioning means, such as a draw bolt 39, therethrough the bolt head 40 bearing against the wall portion 19 and being retained against rotation by means of a tab 41 extending rearwardly of the wall portion 19. A nut 42 is threaded on the bolt and bears against the wall portion 31 of locking element 30, and it is obvious that, when the nut 42 is tightened on the bolt, the locking elements 18 and 30 will be drawn together and the load imposed on the wall portions thereof will be transmitted through the strap portions 22 and 35 to the banding member which is thereby contracted in diameter so that it may be brought into tight contact with the tubing which it encircles.

It is to be noted that the contraction forces drawing the locking elements 18 and 30 together are exerted through the respective wall portions 19 and 31 of these elements, tending to urge same inwardly, which tendency is counteracted by the side portions 20 and 32 which brace the respective wall portions and transmit inwardly to the banding member 10 a component of the load imposed against the locking elements, thus further securing the banding member firmly pressed against the underlying tubing.

In Figs. 4 and 5 there is shown a modified form of the invention in which the locking elements 18' and 30' are similar to the locking elements 18 and 30 of the form shown in Figs. 1 to 3 of the drawing, with the exception of the respective strap portions 43 and 44 thereof which do not include any notches or tabs but comprise longitudinally arcuate strips of width equal to that of the banding member 10' overlying the banding member 10' and rigidly bonded thereto as, for example, by spot welding, as indicated at 45. A tongue strap 26' is formed as an extension of the banding member 10' by mounting the locking element a short distance from the end 15' of the banding member. The modified form is similar in other respects to the form of the invention shown in Figs. 1 to 3 and operates in the same manner, but is somewhat more simple to fabricate.

While those embodiments of this invention hereinbefore illustrated and described are fully capable of performing the objects and accomplishing the advantages primarily stated, it will be understood that this invention is not restricted to the specific embodiments hereinbefore set forth but includes all modifications coming within the scope of the claims which follow.

I claim as my invention:

1. A band clamp, including: a generally circular banding member adapted to encircle a tubing and having spaced-apart end portions, one of said end portions being notched at the edges thereof; a locking element rigidly secured adjacent each of said end portions, each of said locking elements having an upstanding apertured wall portion and side portions formed integrally therewith extending forwardly and inwardly to said banding member, said side portions each having a longitudinally curved inner edge adapted to seat upon said banding member and bear inwardly thereagainst upon constriction of said banding member, one of said locking elements having integrally formed therewith a longitudinally arcuate strap portion, said strap portion having tabs formed integrally therewith engageable with said banding member notches to rigidly secure said locking element to said banding member; a threaded draw bolt passing through the wall portion apertures of the locking elements and bridging the space therebetween; and a nut threaded on said bolt, said bolt and nut being adapted to draw together said locking elements and the end portions of the banding member to constrict the banding member against the tubing.

2. A band clamp, including: a generally circular banding member adapted to encircle a tubing and having spaced-apart end portions, one of said end portions being notched at the edges thereof; a locking element rigidly secured adjacent each of said end portions, each of said locking elements having an upstanding apertured wall portion and side portions formed integrally therewith extending forwardly and inwardly to said banding member, said side portions each having a longitudinally curved inner edge adapted to seat upon said banding member and bear inwardly thereagainst upon constriction of said banding member, one of said locking elements having a longitudinally arcuate strap portion, said strap portion being notched at its edges; a tongue projecting beyond said notched end portion of said banding member and having tabs integrally formed therewith adjacent its edges, said tabs being engageable in said notches to rigidly secure said locking element and said tongue to said banding member; a threaded draw bolt passing through the wall portion apertures of the locking elements and bridging the space therebetween; and a nut threaded on said bolt, said bolt and nut being adapted to draw together said locking elements and the end portions of the banding member to constrict the banding member against the tubing.

RALPH O. DODGE.

References Cited in the file of this patent

UNITED STATES PATENTS

| Number | Name | Date |
|---|---|---|
| 1,473,715 | Wessel | Nov. 13, 1923 |
| 2,359,418 | Hartman | Oct. 3, 1944 |
| 2,402,710 | Tinnerman | June 25, 1946 |
| 2,522,494 | Baldo | Sept. 21, 1950 |

FOREIGN PATENTS

| Number | Country | Date |
|---|---|---|
| 185,212 | Great Britain | Aug. 30, 1922 |
| 896,003 | France | Apr. 17, 1944 |